(12) United States Patent
Hosokawa

(10) Patent No.: US 6,570,826 B2
(45) Date of Patent: May 27, 2003

(54) OPTICAL RECORDING MEDIUM ALLOWING HIGH-DENSITY RECORDING AND REPRODUCTION OF INFORMATION

(75) Inventor: Tetsuo Hosokawa, Higashine (JP)

(73) Assignee: Fujitsu Limited, Kawasaki (JP)

( * ) Notice: Subject to any disclaimer, the term of this patent is extended or adjusted under 35 U.S.C. 154(b) by 275 days.

(21) Appl. No.: 09/794,475

(22) Filed: Feb. 27, 2001

(65) Prior Publication Data

US 2001/0046613 A1 Nov. 29, 2001

(30) Foreign Application Priority Data

May 25, 2000 (JP) ........................................ 2000-154290
Feb. 13, 2001 (JP) ........................................ 2001-035424

(51) Int. Cl.$^7$ ............................................... G11B 11/00
(52) U.S. Cl. ................................ 369/13.55; 369/13.54; 369/275.4
(58) Field of Search ........................... 369/13.55, 13.54, 369/13.35, 13.38, 13.39, 13.41, 275.4; 428/64.3, 694 ML

(56) References Cited

U.S. PATENT DOCUMENTS

| | | | | |
|---|---|---|---|---|
| 5,581,539 A | * | 12/1996 | Horie et al. ............. | 369/275.4 |
| 5,586,109 A | * | 12/1996 | Inui et al. .................... | 369/277 |
| 5,602,823 A | * | 2/1997 | Aoki et al. ............... | 369/275.3 |
| 5,856,969 A | * | 1/1999 | Nishiyama ............... | 369/275.4 |
| 5,991,258 A | * | 11/1999 | Morita et al. ............ | 369/275.4 |
| 6,058,100 A | * | 5/2000 | Mieda et al. ............ | 369/275.4 |
| 6,136,402 A | * | 10/2000 | Imanishi et al. ......... | 369/275.4 |
| 6,400,677 B2 | * | 6/2002 | Kagawa et al. .......... | 369/275.4 |
| 6,407,979 B1 | * | 6/2002 | Matsumoto et al. ..... | 369/275.4 |

FOREIGN PATENT DOCUMENTS

| | | | | |
|---|---|---|---|---|
| EP | 0-880130 A2 | * | 11/1998 | ............... 369/275.4 |
| JP | 8180447 | | 7/1996 | |
| JP | 8273202 | | 10/1996 | |
| JP | 9231615 | | 9/1997 | |
| JP | 11232707 | | 8/1999 | |

* cited by examiner

Primary Examiner—Tan Dinh
(74) Attorney, Agent, or Firm—Greer, Burns & Crain, Ltd.

(57) ABSTRACT

A magnetically induced super-resolution (MSR) magneto-optical recording medium capable of reproducing a recorded mark smaller in size than a beam spot, having recording tracks consisting of lands and grooves. This magneto-optical recording medium includes a transparent substrate on which the lands and the grooves are alternately formed, a magnetic reproducing layer formed on the transparent substrate, and a magnetic recording layer formed on the magnetic reproducing layer. Each land has a first width, and each groove has a second width larger than the first width. The depth of each groove on the substrate is 60 nm or less, and the track pitch is 0.7 µm or less.

12 Claims, 14 Drawing Sheets

F I G. 5 A
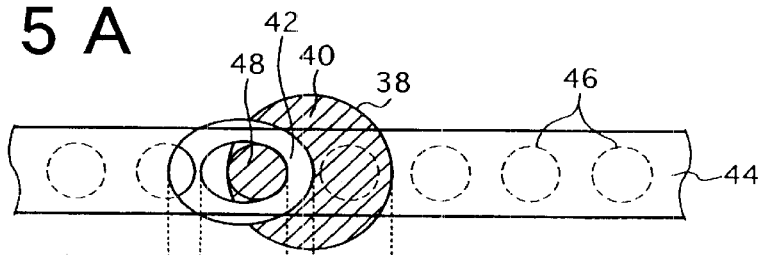
F I G. 5 B
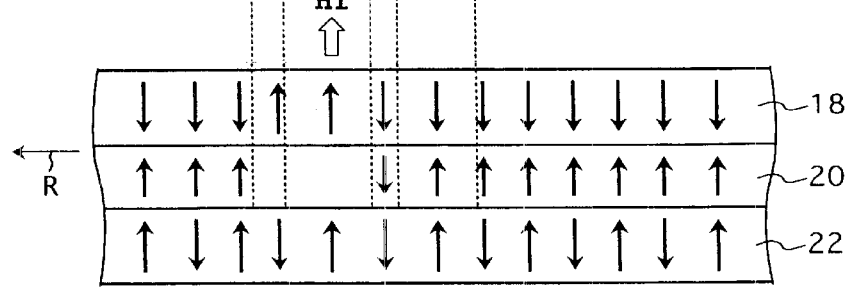

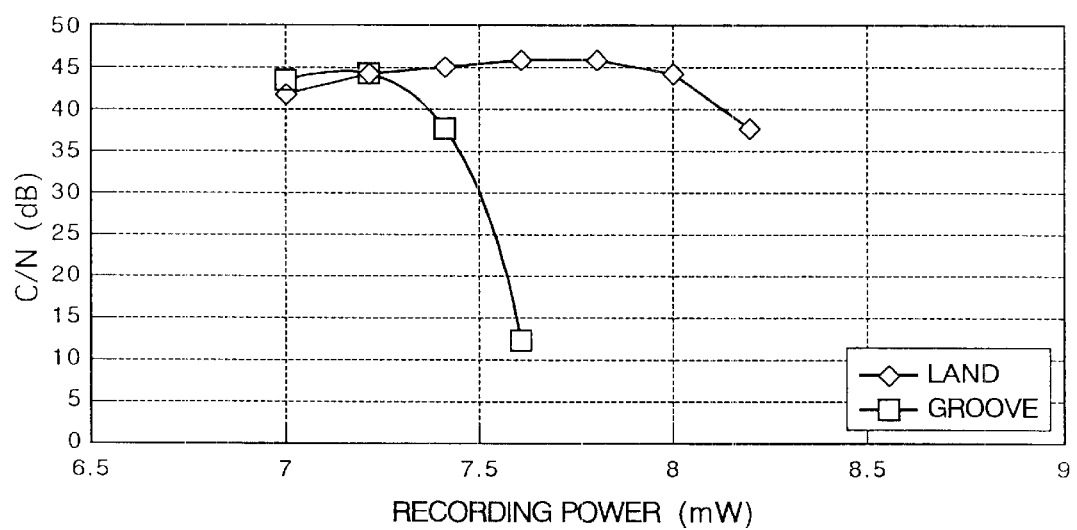
F I G. 1 7

OPTICAL RECORDING MEDIUM ALLOWING HIGH-DENSITY RECORDING AND REPRODUCTION OF INFORMATION

BACKGROUND OF THE INVENTION

1. Field of the Invention

The present invention relates to an optical recording medium, and more particularly to a magneto-optical recording medium allowing high-density recording and reproduction of information.

2. Description of the Related Art

A magneto-optical disk is known as a high-density recording medium, and an increase in its recording density is demanded with an increase in quantity of information. Increasing the recording density of the medium can be realized by shortening the space between adjacent recording marks. However, the reproduction of each recording mark is limited by the size of a light beam (beam spot) on the medium. In the case that the density of the recording marks is set so that only one recording mark is present inside the beam spot, an output waveform corresponding to "1" or "0" can be observed as a reproduced signal according to whether or not the recording mark is present inside the beam spot.

However, in the case that the density of the recording marks is increased so that a plurality of recording marks are present inside the beam spot, the reproduced output does not change irrespective of movement of the beam spot on the medium, so that the output waveform becomes linear and the presence or absence of recording marks cannot be distinguished. The reproduction of such small recording marks having a period shorter than the size of the beam spot may be effected by reducing the size of the beam spot. However, the size of the beam spot is limited by the wavelength A of light output from a light source and the numerical aperture NA of an objective lens, so that the spot size cannot be sufficiently reduced.

Recently commercially available is a magneto-optical disk drive adopting a reproducing method using a magnetically induced super-resolution (MSR) technique for reproducing a recording mark smaller than the size of the beam spot by the use of an existing optical system. The MSR is a reproducing method such that while one mark present inside the beam spot is being reproduced, another mark is masked to thereby increase a reproductive resolution. Accordingly, such an MSR medium requires at least a mask layer or reproducing layer for masking the other mark so that the one mark is reproduced during signal reproduction, in addition to a recording layer for recording marks.

A magneto-optical recording medium using a perpendicularly magnetized film as the reproducing layer is proposed in Japanese Patent Laid-open No. Hei 3-88156, for example. In the prior art described in this publication, however, an initial magnetic field of several kilooersteds is required for initialization of the reproducing layer. Accordingly, the disk drive using this magneto-optical recording medium cannot be reduced in size. A magneto-optical recording medium using a magnetic film having an axis of easy magnetization in a longitudinal direction at room temperature and an axis of easy magnetization in a perpendicular direction at a predetermined temperature or higher as the reproducing layer is proposed in Japanese Patent Laid-open No. Hei 5-81717, for example.

Further, an MSR medium having a reproducing layer, a recording layer, and an intermediate layer interposed between the reproducing layer and the recording layer is described in U.S. Pat. No. 6,020,079. In the MSR medium described in this U.S. Patent, a reproducing laser beam is directed onto the medium to form a temperature distribution composed of a low-temperature region, an intermediate-temperature region, and a high-temperature region inside the beam spot. The low-temperature region and the high-temperature region form a double mask, and a recorded mark is read from only the intermediate-temperature region. Since the double mask is formed by the low-temperature region and the high-temperature region, the intermediate-temperature region for reading a recorded mark can be greatly reduced in size, thereby allowing high-density recording and reproduction. Such a magneto-optical recording medium is referred to as a double-mask rear aperture detection (DRAD) type magneto-optical recording medium.

An MSR magneto-optical recording medium commercially available at present is either of a land recording type such that data is recorded on lands only or of a groove recording type such that data is recorded on grooves only. Attention has recently been given to a land/groove recording type such that data is recorded on both lands and grooves as recording tracks, so as to achieve higher-density recording and reproduction. In a magneto-optical recording medium adopting this land/groove recording type, a transparent substrate having a plurality of lands and a plurality of grooves alternately formed is used.

In the case that a magneto-optical recording film capable of performing MSR reproduction is formed on the land/groove substrate, there is a problem that a reproducing magnetic field required for MSR reproduction of recorded marks becomes large. This is considered to be due to the fact that the center distance between adjacent land and groove, i.e., the track pitch, is small, for example. Further, it is considered that the deposited condition of the magnetic film formed on the substrate is influenced by such a decrease in the track pitch. In particular, the deposited condition of the magnetic film tends to be influenced by a side wall of each groove (a portion between a horizontal surface of each land and a horizontal surface of its adjacent groove), so that an increase in required reproducing magnetic field is considered to be also due to the magnetic film formed at this side wall of each groove. This problem becomes more remarkable as the track pitch is more decreased in order to increase the recording density. In particular, an increase in reproducing magnetic field with a track pitch of 0.7 $\mu$m or less is a large problem. This tendency is remarkable particularly in reproduction on the grooves.

To provide such a large reproducing magnetic field, a large magnet must be installed in a magneto-optical disk drive, so that it is difficult to reduce the size of the magneto-optical disk drive. Further, a power consumption in the magneto-optical disk drive also becomes large. In a conventional land/groove recording type optical disk, the width of each land is substantially equal to the width of each groove in general. However, there have been proposed some examples of an optical disk with the width of each land being different from the width of each groove. For example, Japanese Patent Laid-open No. Hei 8-273202 discloses an optical disk with the width of each groove being greater or smaller than the width of each land, so as to reduce crosstalk and increase the amplitude of a cross track signal.

Further, Japanese Patent Laid-open No. Hei 9-231615 discloses an optical disk with the width of each groove being greater than the width of each land and the level difference between the lands and the grooves being 100 nm or more, so as to reduce thermal crosstalk between adjacent tracks.

While each of the above-mentioned two publications discloses an optical disk with the width of each groove being greater than the width of each land, there is no recognition of the problem to be solved by the present invention such that an increase in reproducing magnetic field is caused by a decrease in the track pitch in a land/groove recording type magneto-optical recording medium.

SUMMARY OF THE INVENTION

It is therefore an object of the present invention to provide a magneto-optical recording medium having recording tracks consisting of lands and grooves which can reduce a reproducing magnetic field.

In accordance with an aspect of the present invention, there is provided a magneto-optical recording medium capable of reproducing a recorded mark smaller in size than a beam spot, having recording tracks consisting of lands and grooves, said magneto-optical recording medium comprising a transparent substrate on which said lands and said grooves are alternately formed; a magnetic reproducing layer formed on said transparent substrate; and a magnetic recording layer formed on said magnetic reproducing layer; each of said lands having a first width; each of said grooves having a second width greater than said first width; the depth of each groove being set to 60 nm or less; and the track pitch of said recording tracks being set to 0.7 $\mu$m or less.

Preferably, said second width of each groove is greater than said first width of each land and less than 1.28 times said first width of each land. More preferably, said second width of each groove is 1.08 to 1.17 times said first width of each land. Preferably, the magneto-optical recording medium further comprises an intermediate layer interposed between said magnetic reproducing layer and said magnetic recording layer; said magneto-optical recording medium being of a double-mask rear aperture detection type.

In accordance with another aspect of the present invention, there is provided an optical recording medium having recording tracks consisting of lands and grooves, comprising a transparent substrate on which said lands and said grooves are alternately formed; and an optical recording layer formed on said transparent substrate by sputtering; said optical recording layer having a first mark recorded on each of said lands and a second mark recorded on each of said grooves; said first mark on each land having a first width; said second mark on each groove having a second width smaller than said first width of said first mark.

Preferably, each land has a third width; each groove has a fourth width greater than said third width; the depth of each groove is set to 60 nm or less; and the track pitch of said recording tracks is set to 0.7 $\mu$m or less. Preferably, said fourth width of each groove is greater than said third width of each land and less than 1.28 times said third width of each land. More preferably, said fourth width of each groove is 1.08 to 1.17 times said third width of each land.

Preferably, said optical recording layer comprises a magnetic reproducing layer and a magnetic recording layer; and said optical recording medium is a magnetically induced super-resolution magneto-optical recording medium. More preferably, said optical recording layer further comprises an intermediate layer interposed between said magnetic reproducing layer and said magnetic recording layer; and said magnetically induced super-resolution magneto-optical recording medium is of a double-mask rear aperture detection type.

The above and other objects, features and advantages of the present invention and the manner of realizing them will become more apparent, and the invention itself will best be understood from a study of the following description and appended claims with reference to the attached drawings showing some preferred embodiments of the invention.

BRIEF DESCRIPTION OF THE DRAWINGS

FIGS. 5A and 5B are a plan view and a vertical sectional view of a part of the recording medium, respectively, for illustrating a data reproducing method in the present invention;

FIG. 17 is a graph showing the dependence of a C/N on a recording power in a medium having a groove width smaller than a land width.

DETAILED DESCRIPTION OF THE PREFERRED EMBODIMENTS

Figure 1:
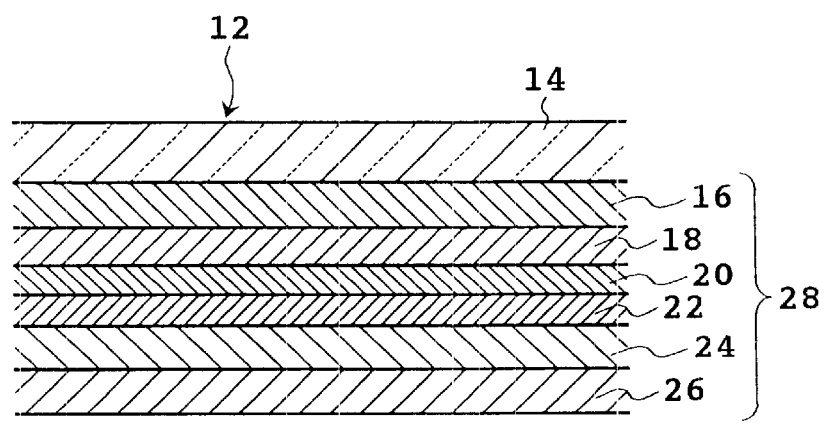
FIG. 1 is a vertical sectional view of a magneto-optical recording medium according to a preferred embodiment of the present invention.
Figure 2:
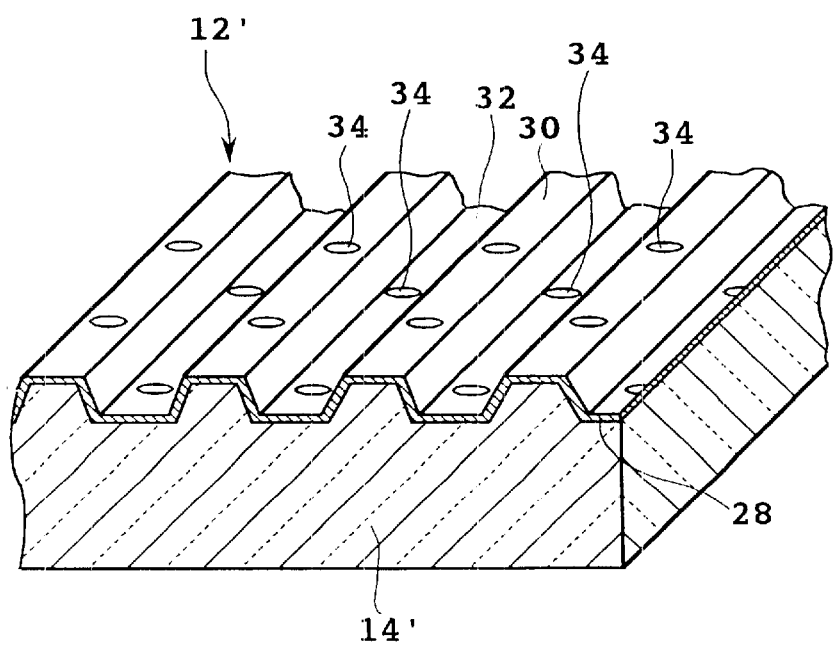
FIG. 2 is a fragmentary perspective view of a land/groove recording type magneto-optical recording medium.

Referring to FIG. 1, there is shown a sectional view of a magneto-optical recording medium 12 according to a preferred embodiment of the present invention. The magneto-optical recording medium 12 usually has the form of a disk. Reference numeral 14 denotes a transparent substrate formed of glass or the like. As shown in FIG. 2, the transparent substrate 14 actually has a plurality of lands 30 and grooves 32 alternately formed.

Specifically, a stamper having a positive resist film is used and it is exposed to a laser beam at a portion except a portion corresponding to grooves and pits for an ID signal. Then, the portion corresponding to the grooves and the pits is formed into a projecting portion by development and etching. Then, the stamper thus formed is mounted on a die of an injection molding machine, and a resin such as polycarbonate is supplied to the injection molding machine to thereby manufacture a transparent substrate of an optical recording medium. Then, a recording layer, protective layer, reflective layer, etc. are formed on a transfer surface (a surface formed with the grooves and the pits) of the transparent substrate to thereby manufacture the optical recording medium. A manufacturing method for such a substrate is known in the art as described in the Prior Art of the specification of Japanese Patent Laid-open No. Hei 11-232707, for example.

In the present invention, each groove is required to have a predetermined width greater than the width of each land and a predetermined depth. Therefore, in preparing the stamper, the widths and depths of portions corresponding to each land and each groove must be controlled to predetermined widths and depths. That is, the stamper is prepared so that the portion corresponding to each land has a first width, the portion corresponding to each groove has a second width greater than the first width, and the portion corresponding to each groove has a depth of 60 nm or less, thereby allowing the preparation of the substrate in the present invention.

More specifically, the stamper is prepared so that the width of the portion corresponding to each land is set to 0.61 $\mu$m, the width of the portion corresponding to each groove is set to 0.69 $\mu$m, and the depth of the portion corresponding to each groove is set to 35 nm, for example, thereby allowing the preparation of the substrate having desired widths of each land and each groove according to the present invention. In the case that the transparent substrate is formed of glass, a transfer layer for transferring the grooves and the pits by means of the above-mentioned stamper is formed on the transparent substrate, and the grooves and the pits of the stamper are transferred to the transfer layer of the substrate to thereby form the grooves and the lands.

A dielectric layer 16 of SiN or the like is formed on the transparent substrate 14 by sputtering, for example. The dielectric layer 16 prevents oxidation and corrosion of a magnetic layer formed thereon. Resins such as polycarbonate, polymethylmethacrylate, and amorphous polyolefin may also be adopted as the transparent substrate 14. Further, metal nitrides such as SiN and AlN, metal oxides such as $SiO_2$ and $Al_2O_3$, and metal sulfides such as ZnS may also be adopted as the dielectric layer 16.

A magnetic reproducing layer 18 of GdFeCo is formed on the dielectric layer 16. The magnetic reproducing layer 18 has an axis of easy magnetization in a direction perpendicular to its layer surface. The magnetic reproducing layer 18 is metal-dominant, or metal-rich such that the magnetic moment of transition metal is dominating over the magnetic moment of rare earth. The Curie temperature of the magnetic reproducing layer 18 is about 250° C. to about 300° C.

A magnetic intermediate layer 20 of GdFeCoSi is formed on the magnetic reproducing layer 18. The magnetic intermediate layer 20 has an axis of easy magnetization in a plane at room temperature. The axis (direction) of easy magnetization of the magnetic intermediate layer 20 changes from the in-plane direction to the perpendicular direction at a temperature higher than or equal to a predetermined temperature at which this layer 20 is heated by a reproducing beam power. As will be hereinafter described in detail, this predetermined temperature is preferably about 130° C. or more. The Curie temperature of the magnetic intermediate layer 20 is about 200° C. or less. A magnetic recording layer 22 of TbFeCo is formed on the magnetic intermediate layer 20. The magnetic recording layer 22 has an axis of easy magnetization in a direction perpendicular to its layer surface. The Curie temperature of the magnetic recording layer 22 is about 250° C. to about 270° C.

A protective layer 24 of SiN is formed on the magnetic recording layer 22. The protective layer 24 is provided for the purpose of preventing the entry of water or oxygen in the air or other substances such as halogen to protect the magnetic recording layer 22. Metal nitrides such as SiN and AlN, metal oxides such as $SiO_2$ and $Al_2O_3$, and metal sulfides such as ZnS may also be adopted as the protective layer 24. Further, a recording sensitivity adjusting layer (reflective layer) 26 of aluminum (Al) and a resin coating layer are formed on the protective layer 24. Thus, the magneto-optical recording medium 12 is completed.

As mentioned above, the magneto-optical recording medium 12 is configured by forming on the transparent substrate 14 a multilayer film 28 including the dielectric layer 16, the magnetic reproducing layer 18, the magnetic intermediate layer 20, the magnetic recording layer 22, the protective layer 24, and the recording sensitivity adjusting layer 26.

Referring again to FIG. 2, the center distance (track pitch) between any adjacent ones of the lands 30 and the grooves 32 of the substrate 14 is 0.65 $\mu$m, and the multilayer film 28 is formed on the substrate 14. The level difference between the lands 30 and the grooves 32 of the substrate 14 is 35 nm, for example. Preferably, the track pitch is in the range of 0.2–0.7 $\mu$m. If the track pitch is less than 0.2 $\mu$m, tracking becomes difficult and in the case the track pitch exceeds 0.7 $\mu$m, the magneto-optical recording medium is not suited for high density recording of the land and groove recording system. More preferably, the track pitch is in the range of 0.3–0.5 $\mu$m.

Because the magneto-optical recording medium 12 is a magneto-optical recording medium having recording tracks consisting of both lands and grooves, a plurality of marks 34 are recorded on both the lands 30 and the grooves 32. The present invention is intended to suppress an increase in reproducing magnetic field in such a land/groove recording type magneto-optical recording medium having a small track pitch.

Figure 3:
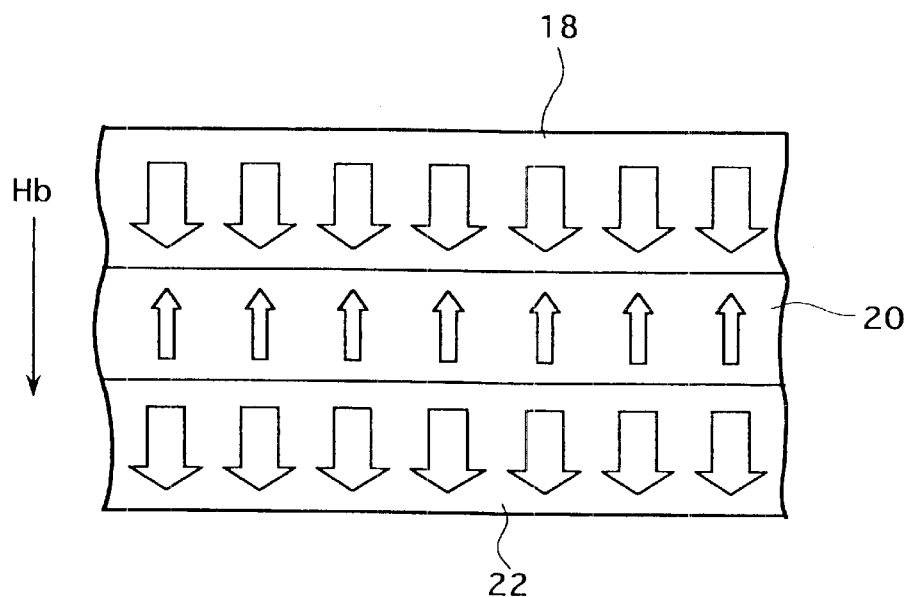
FIG. 3 is a vertical sectional view for illustrating data erasing in the present invention.

While a data erasing method, writing method, and reading method in the present invention are similar to those mentioned in U.S. Pat. No. 6,020,079 mentioned above, these methods will now be described in brief with reference to FIGS. 3 to 5. First, the data erasing method in the present invention will now be described with reference to FIG. 3. A laser beam is directed onto the recording medium as applying a bias magnetic field Hb in the downward direction to heat the recording layer 22 to a temperature higher than or equal to the Curie temperature of the recording layer 22, thereby ordering the magnetization in the recording layer 22 in the downward direction. When the recording medium is moved apart from the laser beam, the temperature of the recording medium lowers to room temperature. At room temperature, magnetic coupling between the reproducing layer 18 and the recording layer 22 becomes weak. Immediately after this step, a bias magnetic field Hb in the upward direction is applied to the recording medium. As a result, the magnetization in the reproducing layer 18 is ordered in the downward direction by the exchange coupling force between the reproducing layer 18 and the magnetization of FeCo in the intermediate layer 20. It is to be noted that while the overall magnetization direction of the intermediate layer 20 is upward direction, the magnetization direction of FeCo in the intermediate layer 20 is oriented downward.

Figure 4:
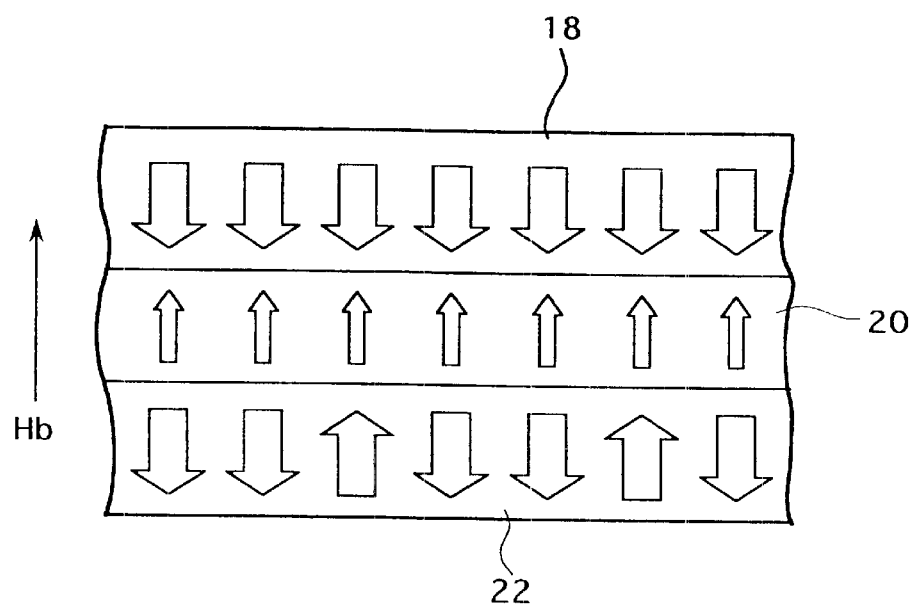
FIG. 4 is a vertical sectional view for illustrating data writing in the present invention.

The data writing method in the present invention will now be described with reference to FIG. 4. In writing data, an intense laser beam is directed onto only a recording portion on the medium as applying a bias magnetic field Hb in a direction opposite to the erasing direction, i.e., in the upward direction. As a result, the direction of the magnetization at only the recording portion is inverted to the upward direction. When the recording medium is moved apart from the laser beam, the temperature of the recording medium lowers to room temperature. At room temperature, magnetic coupling between the reproducing layer 18 and the recording layer 22 becomes weak. As a result, the magnetization direction in the reproducing layer 18 is ordered in the downward direction by the exchange coupling force between the reproducing layer 18 and FeCo in the intermediate layer 20.

The data double-mask reproducing method in the present invention will now be described with reference to FIGS. 5A and 5B. When a sufficiently intense reproducing laser beam is directed onto the recording medium, there is formed in a beam spot 38 a low-temperature region where the magnetization in the reproducing layer 18 is oriented in the downward direction by the exchange coupling between the reproducing layer 18 and FeCo in the intermediate layer 20, an intermediate-temperature region where the magnetization in the recording layer 22 is transferred to the intermediate layer 20 and the reproducing layer 18 by exchange coupling, and a high-temperature region where the temperature in this region is not less than the Curie temperature Tc of the intermediate layer 20 as shown in FIGS. 5A and 5B. As shown in FIG. 5A, a plurality of marks 46 shown by the broken lines are formed in a track 44. In the high-temperature region, there is formed up-spin mask 48 where the direction of the magnetization in the reproducing layer 18 coincides with the direction of the bias magnetic field Hr. An opening 42 is formed in the intermediate-temperature region between the two masks 40 and 48.

At the up-spin mask 48, the recording medium is heated to a temperature not less than the Curie temperature Tc of the intermediate layer 20, so that the magnetization in the intermediate layer 20 disappears and the reproducing layer 18 and the recording layer 22 are not magnetically coupled with each other. Accordingly, the magnetization in the reproducing layer 18 at the up-spin mask 48 is oriented in the direction of the reproducing bias magnetic field Hr because the reproducing layer 18 has a small coercive force at room temperature. That is, the direction of the magnetization in the reproducing layer 18 is always upward at a temperature not less than the Curie temperature Tc of the intermediate layer 20, and the reproducing layer 18 at the up-spin mask 48 functions as a kind of mask through which no magneto-optical signal is output.

Accordingly, the very small opening 42 through which data recorded in the recording layer 22 is read can be formed. Further, the opening 42 is formed at a central portion of the beam spot 38 where the laser intensity is higher than that at an edge portion of the beam spot, so that a large magneto-optical signal can be obtained. As mentioned above, in the case that the track pitch becomes small as in a land/groove recording type magneto-optical recording medium, the reproducing magnetic field required for MSR reproduction of marks recorded on the medium tends to become large. There will now be described the present invention capable of reducing the reproducing magnetic field required.

Figure 6:
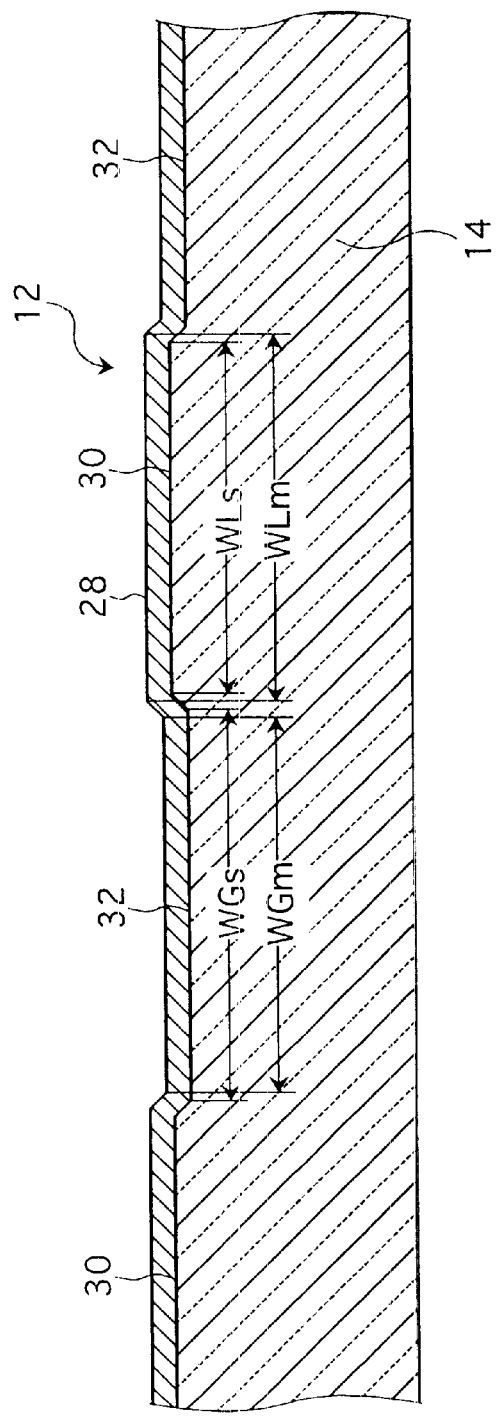
FIG. 6 is an enlarged sectional view of the land/groove recording medium.

Referring to FIG. 6, there is shown an enlarged sectional view of the land/groove magneto-optical recording medium 12. The multilayer film 28 is formed on the transparent substrate 14 having the lands 30 and the grooves 32 alternately formed. It is observed in FIG. 6 that a groove film width WGm is smaller than a groove substrate width WGs at each groove 32 and that a land film width WLm is larger than a land substrate width WLs at each land 30. Thus, there is a tendency that a portion of the multilayer film 28 formed on the substrate 14 at each groove 32 becomes smaller. Accordingly, it may be considered that in a land/groove magneto-optical recording medium having a small track pitch with the widths of each land and each groove of the substrate being set equal to each other, a magnetic field required for MSR reproduction of marks recorded on the film portion corresponding to each groove of the substrate becomes larger than that for MSR reproduction of marks recorded on the film portion corresponding to each land of the substrate.

In the following experiment, the groove width in relation to the land width and the groove depth allowing the suppression of an increase in reproducing magnetic field were examined on a land/groove magneto-optical recording medium. A land/groove substrate with the center distance (track pitch) between adjacent land and groove set to 0.65 μm was prepared. The level difference between the lands and the grooves of this substrate was 35 nm. A stationary opposed type sputtering device having a plurality of deposition chambers (sputter chambers) each capable of achieving an ultimate vacuum of $5 \times 10^{-5}$ Pa or less was prepared.

First, the substrate was carried into the first chamber in which an Si target was mounted, and Ar gas and $N_2$ gas were introduced into the first chamber to deposit an SiN layer having a thickness of 90 nm on the substrate by reactive sputtering. The substrate was next moved into the second chamber in which a GdFeCo alloy target was mounted, and Ar gas was introduced into the second chamber to deposit a reproducing layer having a thickness of 50 nm by DC sputtering. The deposition conditions for the reproducing layer were 5.0 Pa for Ar pressure and 5.5 nm/sec for sputter rate.

The substrate was next moved into the third chamber in which a GdFeCoSi alloy target was mounted, and Ar gas was introduced into the third chamber to deposit an intermediate layer having a thickness of 40 nm. The deposition conditions for the reproducing layer were 4 Pa for Ar pressure and 8 nm/sec for sputter rate. The substrate was next moved into the fourth chamber in which a TbFeCo alloy target was mounted, and Ar gas was introduced into the fourth chamber to deposit a recording layer having a thickness of 50 nm under the deposition conditions that the sputter rate was fixed to 7 nm/sec and the Ar pressure was fixed to 7 Pa.

The substrate was next moved into the fifth chamber in which an Si target was mounted to deposit an SiN layer having a thickness of 25 nm on the recording layer under the same deposition conditions as those in the first chamber. Further, the substrate was next moved into the sixth chamber in which an Al target was mounted to deposit an Al layer having a thickness of 20 nm. Finally, an organic protective layer is formed on the multilayer film deposited on the substrate as above by spin coating to prepare a magneto-optical disk.

On the other hand, a disk tester was used for evaluation and measurement on the magneto-optical disk prepared above. The disk tester includes an optical pickup having a laser light source for outputting a laser beam having a wavelength of 650 nm and an objective lens having a numerical aperture NA of 0.55. The magneto-optical disk prepared above was set on the disk tester and rotated at a linear velocity of 7.5 m/sec to record a repeated signal with a period of 0.3 µm on both the lands and the grooves. The recording power was set so that the amplitude of a reproduced signal from the lands becomes substantially equal to that from the grooves.

Figure 7:
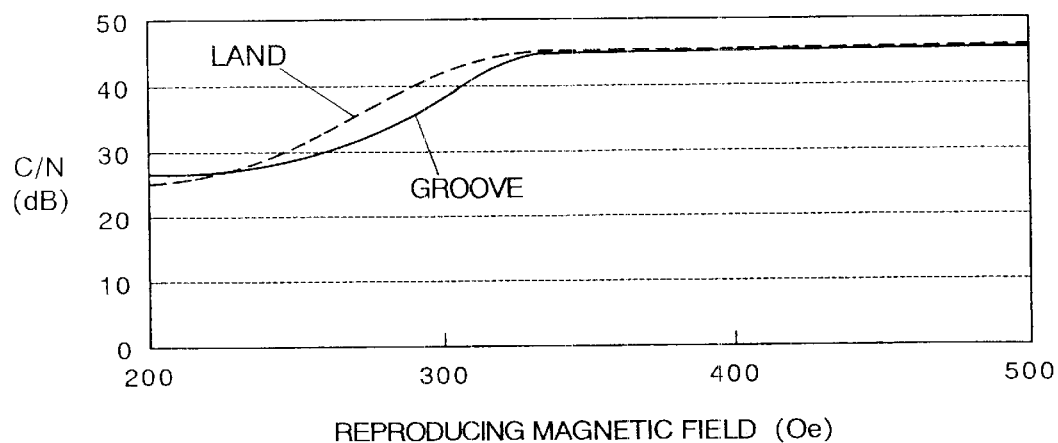
FIG. 7 is a graph showing the dependence of a C/N on a reproducing magnetic field in a medium having a groove width larger than a land width.
Figure 8:
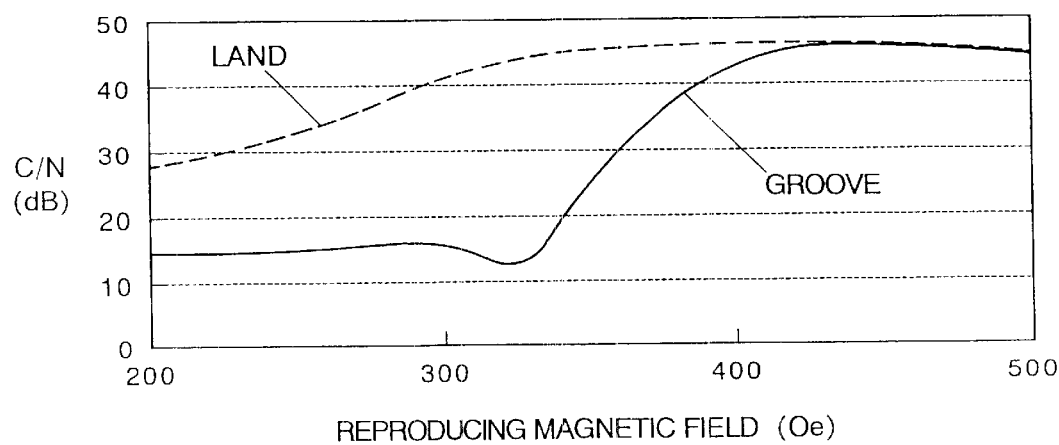
FIG. 8 is a graph showing the dependence of a C/N on a reproducing magnetic field in a medium having a groove width equal to a land width.
Figure 9:
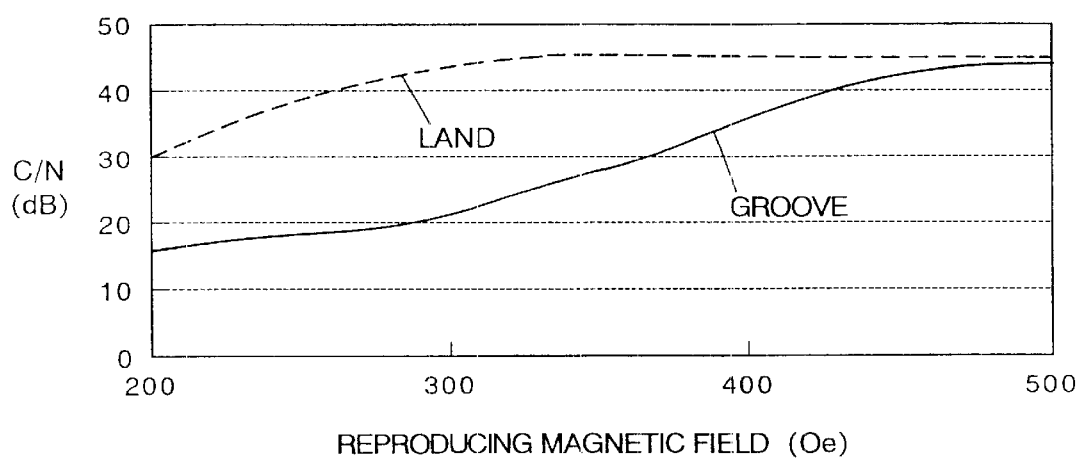
FIG. 9 is a graph showing the dependence of a C/N on a reproducing magnetic field in a medium having a groove width smaller than a land width.

FIGS. 7 to 9 show the results of reproduction of the recorded signal by applying a reproducing power Pr of 4.8 mW and changing a reproducing magnetic field Hr. FIG. 7 shows the case that the ratio of the land width to the groove width was set to 0.61/0.69, that is, the land width is smaller than the groove width on the substrate. As apparent from FIG. 7, a sufficient C/N is obtained both on the lands and on the grooves at a reproducing magnetic field Hr of about 300 oersteds (Oe). Conversely in the case that the land width is larger than the groove width, a magnetic field required for obtaining a sufficient C/N on the grooves is rapidly increased as shown in FIG. 9. That is, a reproducing magnetic field of 500 oersteds (Oe) or more is required for a sufficient C/N on the grooves. Also in the case that the land width is equal to the groove width, the reproducing magnetic field on the grooves is larger than that on the lands as shown in FIG. 8.

As understood from these results, an increase in reproducing magnetic field on the grooves can be suppressed by making the groove width larger than the land width of the land/groove substrate. As shown in FIG. 7, there is no remarkable decrease in C/N in spite of a decrease in the land width, and substantially the same level of C/N is obtained on the lands and the grooves.

Figure 10:
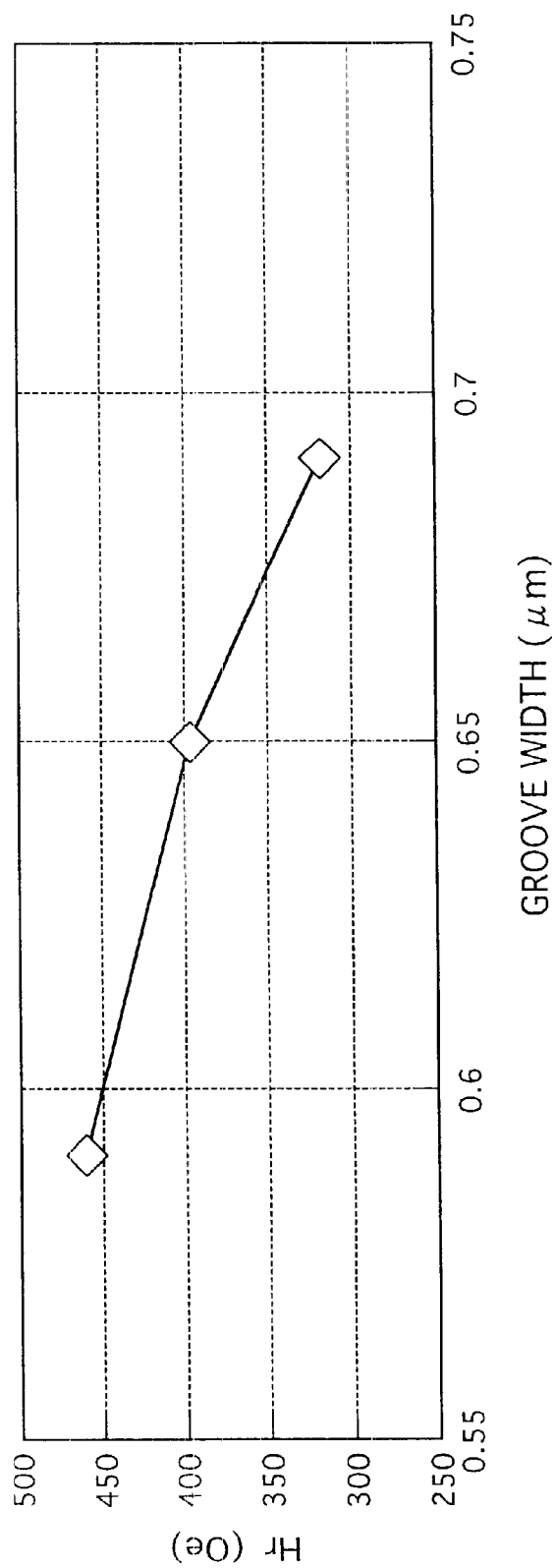
FIG. 10 is a graph showing the dependence of a magnetic field required for reproduction on a groove width.
Figure 11:
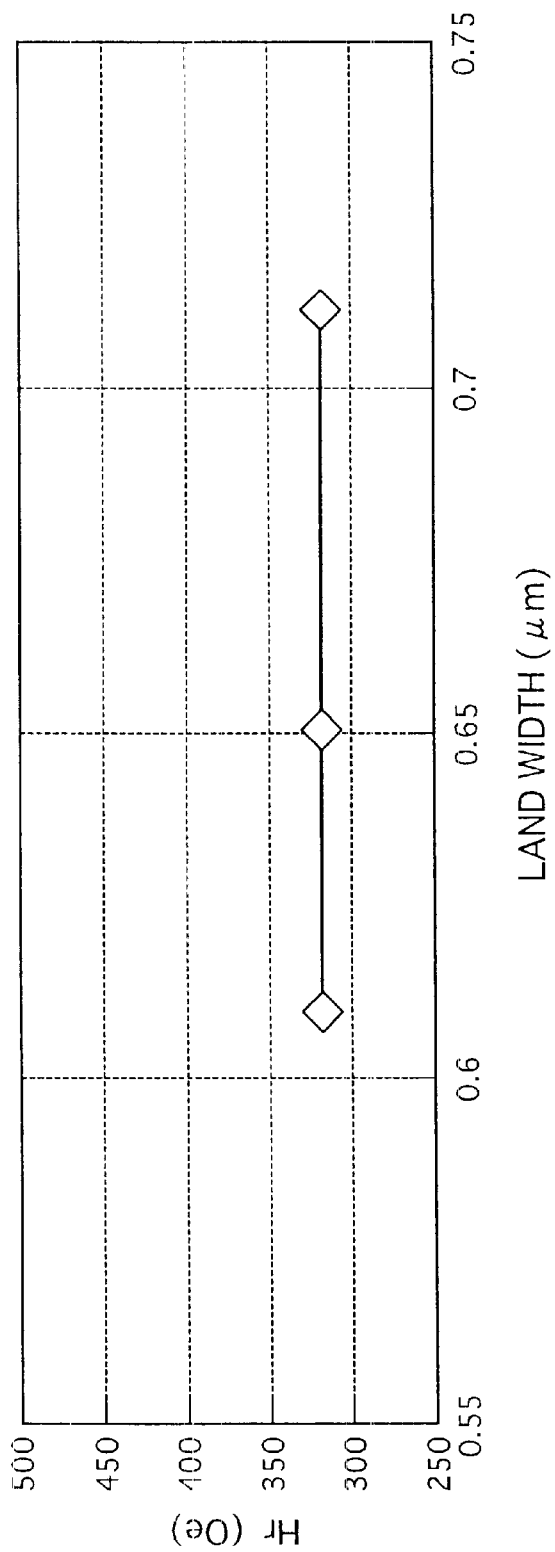
FIG. 11 is a graph showing the dependence of a magnetic field required for reproduction on a land width.

FIG. 10 shows the dependence of the reproducing magnetic field Hr on the groove width. As apparent from FIG. 10, the magnetic field required for reproduction is reduced by increasing the groove width. FIG. 11 shows the dependence of the reproducing magnetic field Hr on the land width. As apparent from FIG. 11, the reproducing magnetic field is substantially constant regardless of a change in the land width. It is understood from the results shown in FIGS. 10 and 11 that the reproducing magnetic fields on both the lands and the grooves can be reduced by making the groove width larger than the land width.

Figure 12:
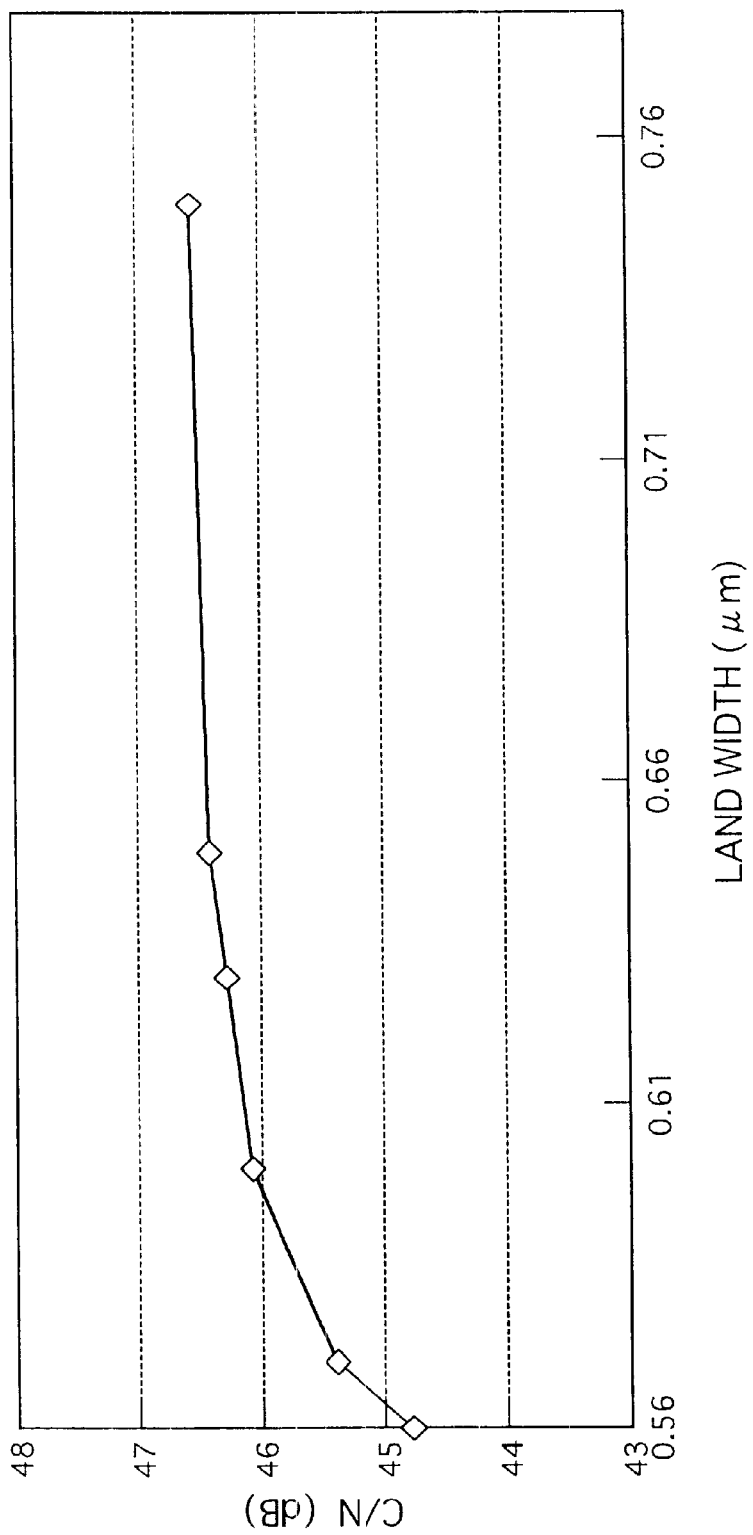
FIG. 12 is a graph showing the dependence of a C/N on a land width.
Figure 13:
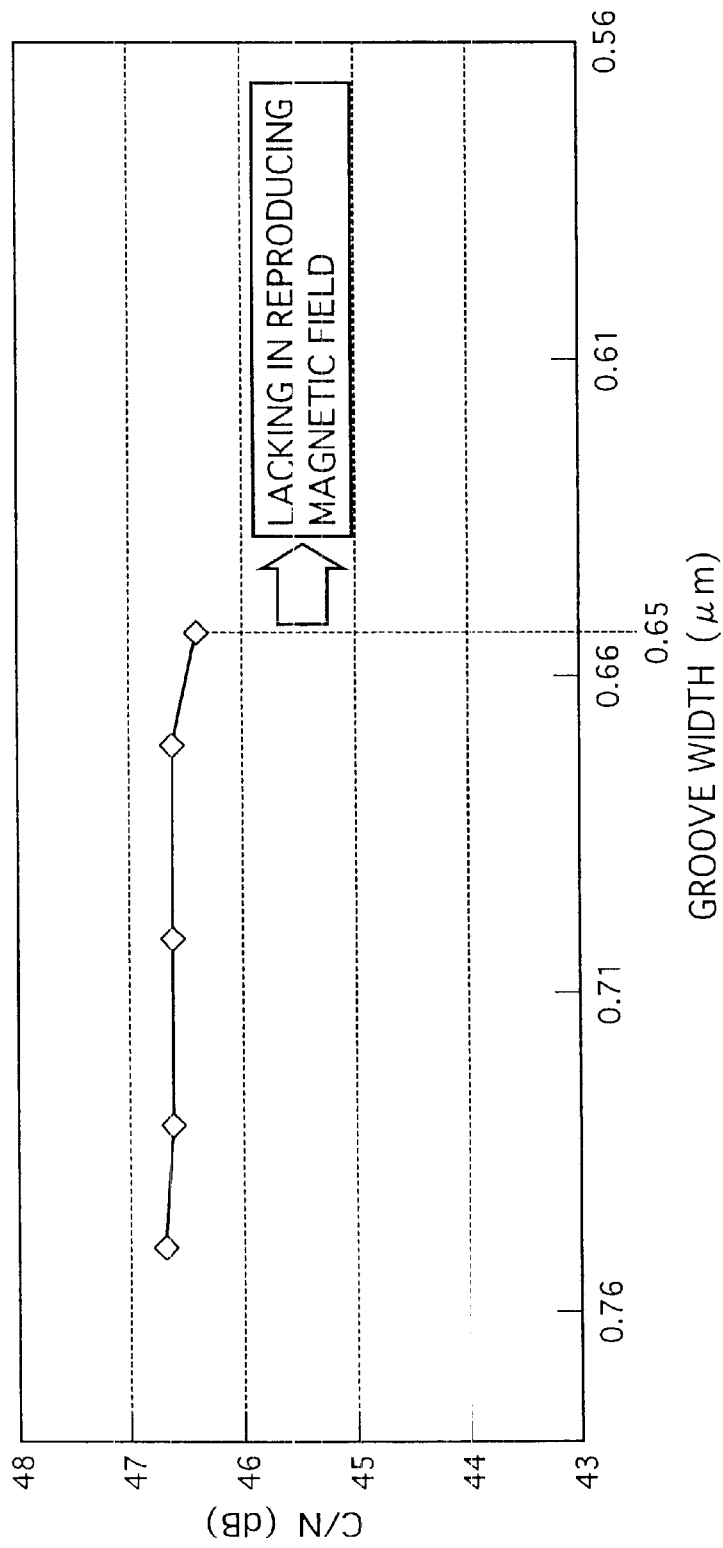
FIG. 13 is a graph showing the dependence of a C/N on a groove width.

FIG. 12 shows the dependence of the C/N on the land width, and FIG. 13 shows the dependence of the C/N on the groove width. The measurements in FIGS. 12 and 13 were made under the conditions that the track pitch was 0.65 µm and the groove depth was 45 nm. In general, the C/N to be required is 45 dB or more. Accordingly, the land width to be required is 0.56 µm or more as apparent from FIG. 12. In this case, the groove width becomes 0.74 µm (=1.3 µm−0.56 µm).

As apparent from FIG. 13, when the groove width is 0.66 µm or more, the C/N becomes 46 dB or more, which is a sufficient value of the C/N. However, in the case that the land width and the groove width are both 0.65 µm as shown in FIG. 8, the required reproducing magnetic field on the grooves becomes very large. Accordingly, letting Gw and Lw denote the groove width and the land width, respectively, the condition for suppression of an increase in the required reproducing magnetic field on the grooves is preferably 1<Gw/Lw<0.74/0.56=1.28, more preferably, 1.08<Gw/Lw<1.17.

Figure 14:
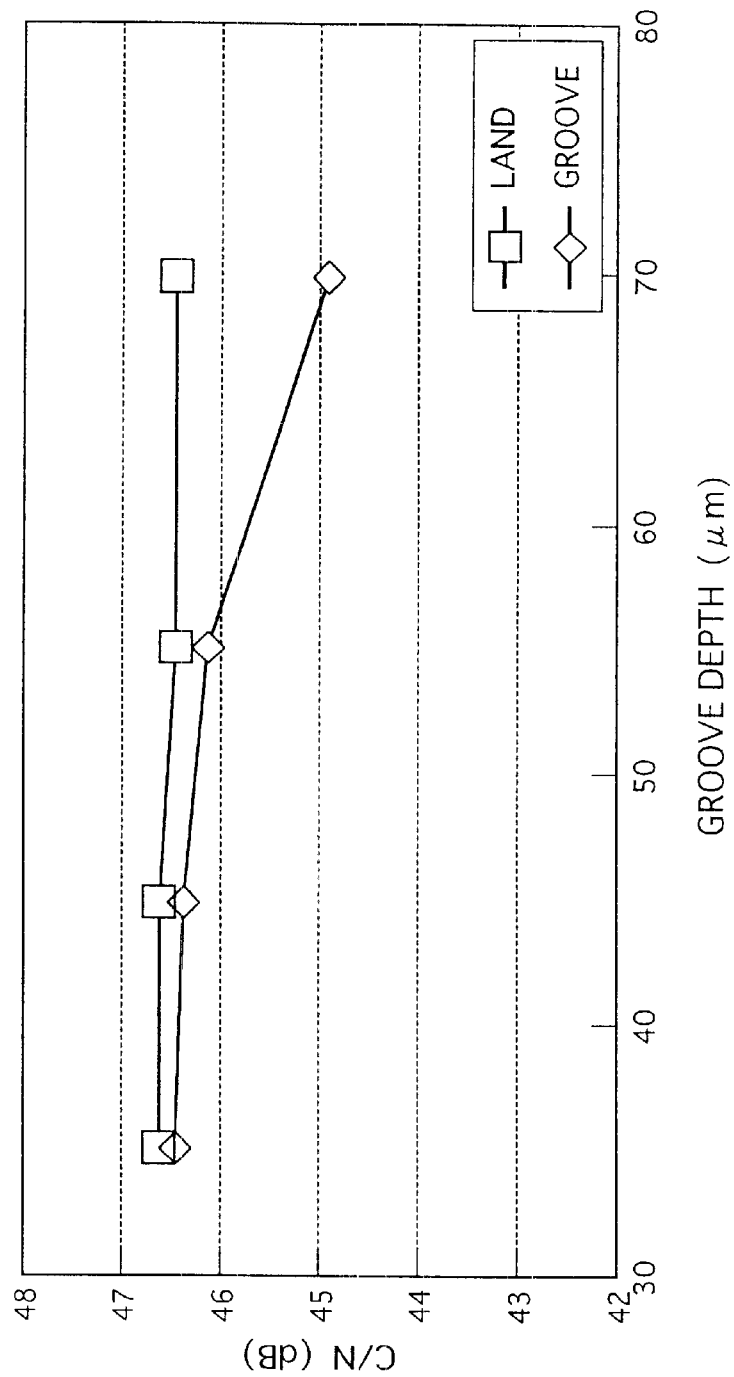
FIG. 14 is a graph showing the dependence of a C/N on a groove depth.

FIG. 14 shows the dependence of the C/N on the groove width. The measurement in FIG. 14 was made under the conditions that the track pitch was 0.65 µm and the groove width is 1.1 times the land width. As apparent from FIG. 14, when the groove depth is greater than 60 nm, a satisfactory C/N is not obtained on the grooves. Therefore, the groove depth is preferably set to 60 nm or less, more preferably, 50 nm or less. If groove depth becomes less than 20 nm, tracking becomes difficult. Therefore, the groove depth is preferably in the range of 20–60 nm. More preferably, the groove depth is in the range of 30–50 nm.

Figure 15:
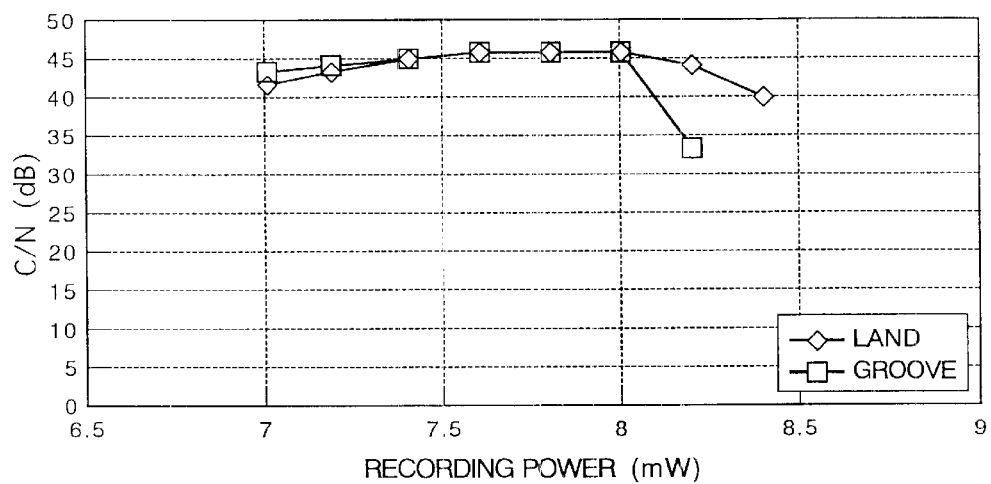
FIG. 15 is a graph showing the dependence of a C/N on a recording power in a medium having a groove width larger than a land width.
Figure 16:
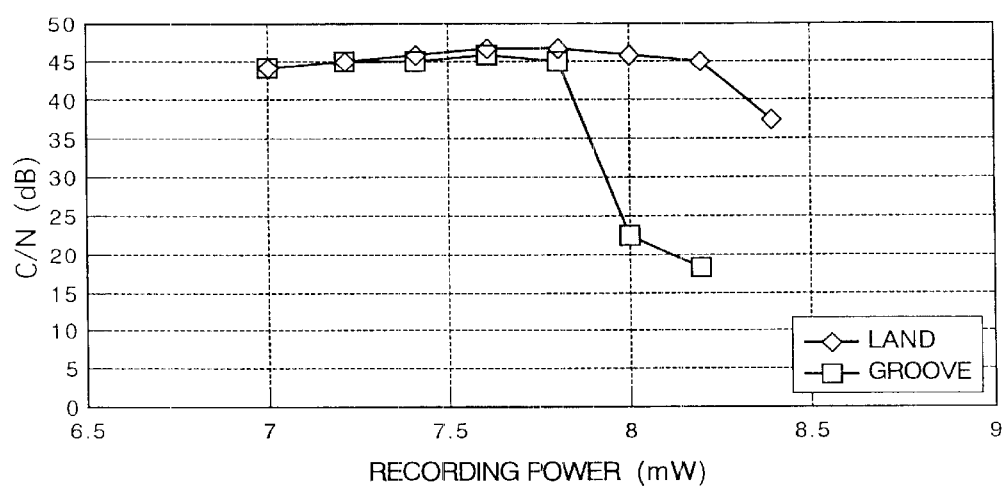
FIG. 16 is a graph showing the dependence of a C/N on a recording power in a medium having a groove width equal to a land width.

FIGS. 15 to 17 show the dependence of the C/N on the recording power. FIG. 15 corresponds to the case that the land width is 0.61 µm and the groove width is 0.69 µm, FIG. 16 corresponds to the case that the land width and the groove width are both 0.65 µm, and FIG. 17 corresponds to the case that the land width is 0.68 µm and the groove width is 0.62 µm. FIGS. 15 to 17 show the results of recording and reproduction of a repeated signal having a period of 0.3 µm to the lands and the grooves with the recording power Pw being changed. The measurements were made under the conditions that the reproducing power Pr was set to 4.3 mW and the reproducing magnetic field Hr was set to 350 oersteds (Oe).

As apparent from FIGS. 15 to 17, a recording power margin on the grooves is small. That is, when the recording power is high, the reproducing magnetic field becomes to lack causing a reduction in C/N. In the case that the groove width is larger than the land width as shown in FIG. 15, a reduction in C/N can be prevented. Further, as apparent from FIGS. 15 to 17, a reduction in C/N can be prevented by reducing the recording power on the grooves.

As apparent from FIGS. 15 to 17, a rapid decrease in C/N on the lands is not remarkably observed regardless of an increase in the recording power. However, when the recording power is increased on the grooves, the C/N is rapidly decreased. Specifically, in the case of FIG. 17, the C/N is rapidly decreased at a recording power of 7.4 mW. In the case of FIG. 16, the C/N is rapidly decreased at a recording power of 7.8 mW. In the case of FIG. 15, the C/N is rapidly decreased at a recording power of 8.2 mW.

Such a rapid decrease in C/N is caused by a rapid increase in reproducing magnetic field required for MSR reproduction. That is, when a mark is recorded with high power, the width of the recorded mark becomes large, causing an increase in required reproducing magnetic field. This increase in required reproducing magnetic field may be due to the influence of film deposition by the narrowing of the track pitch. It is understood from this result that a rapid increase in reproducing magnetic field can be suppressed by making the recording power on the grooves lower than that on the lands.

As mentioned above, high-power recording causes an increase in width of a recorded mark. Accordingly, it is preferable to make the width of a mark recorded on each land larger than the width of a mark recorded on each groove. In this case, only the mark size may be changed without changing the widths of each land and each groove. In the magneto-optical disk with the groove width set larger than the land width as shown in FIG. 15, the width of a recorded mark on each groove is preferably set to not greater than 0.95 times to less than 1 times the width of a recorded mark on each land.

This method of recording such that the width of a recorded mark on each land becomes larger than the width of a recorded mark on each groove is not limited to a magneto-optical recording medium, but may also be applied similarly to a phase-change type optical recording medium having an optical recording layer formed by sputtering. Particularly in an MSR type magneto-optical recording medium, this method is effective in the sense of suppressing an increase in reproducing magnetic field. This invention is also applicable to other MSR mediums having different film configurations such as double-mask rear aperture detection (D-RAD) medium and center aperture detection (CAD) medium. Further, this method is considered effective not only in MSR, but also in a magnetically enlarged reproduction technique utilizing a reproducing magnetic field.

Figure 18:
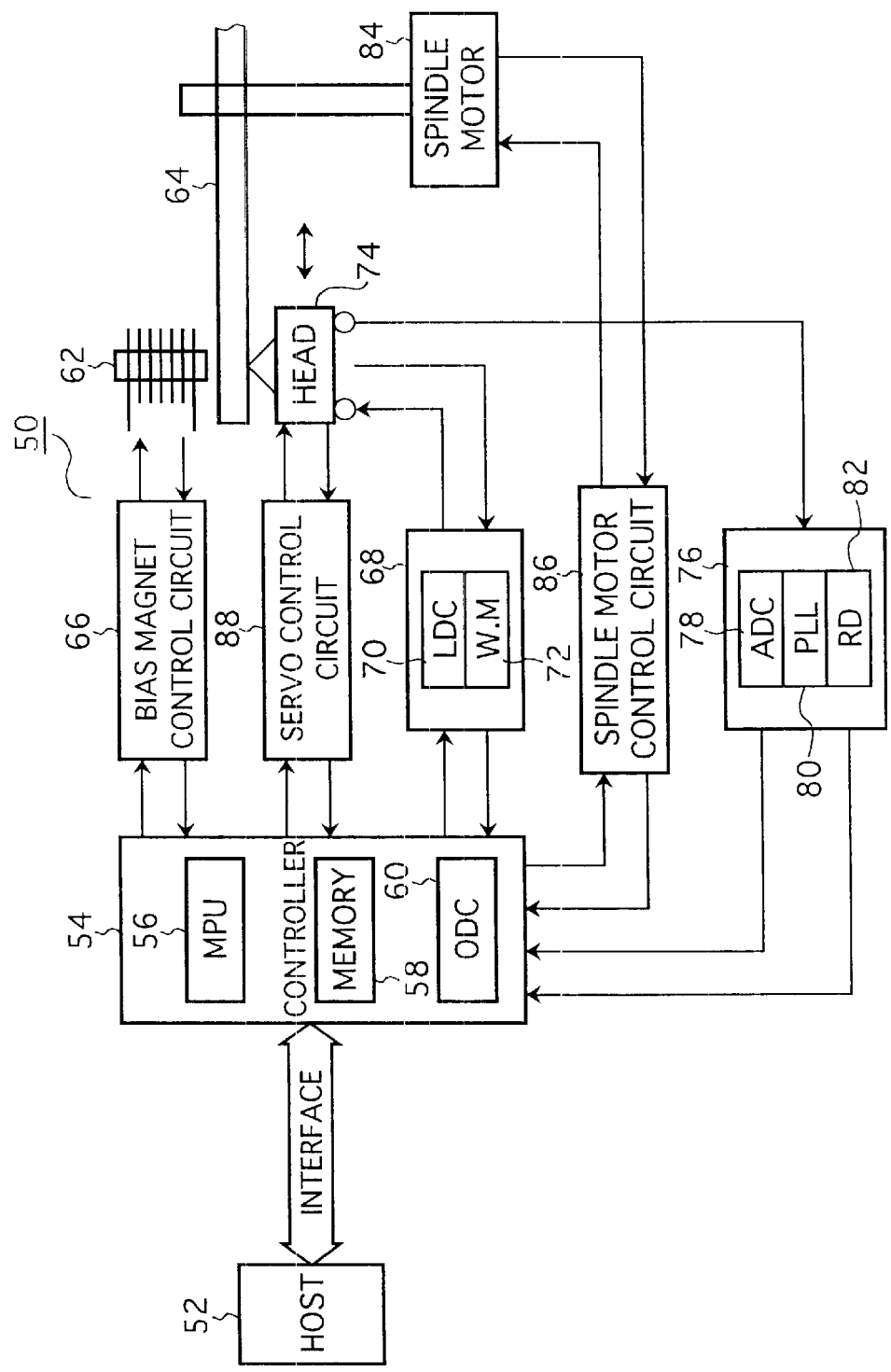
FIG. 18 is a block diagram of a magneto-optical disk drive suit able for applying the present invention thereto.

FIG. 18 shows a magneto-optical disk drive 50 suitable for recording/reproducing information on the magneto-optical recording medium of the present invention. The magneto-optical disk drive 50 is connected to a host computer 52. A controller 54 has an interface (not shown), MPU 56, memory 58, and optical disk controller (ODC) 60. The interface exchanges commands and data between the magneto-optical disk drive 50 and the host computer 52. The MPU 56 performs general control of the magneto-optical disk drive. The ODC 60 performs specific controls such as CRC and ECC for the exchange of data between the magneto-optical disk drive 50 and the host computer 52.

A bias magnet 62 applies a bias magnetic field to a magneto-optical disk 64. The magneto-optical disk 64 is a magnetically induced super-resolution (MSR) magneto-optical disk. A bias magnet control circuit 66 controls the magnetic field of the bias magnet 62 according to an instruction from the MPU 56. A write LSI circuit 68 has a laser diode control circuit 70 and a write modulator 72. The write modulator 72 modulates write data from the ODC 60 into data in pit position modulation (PPM) recording or pulse width modulation (PWM) recording data format according to the kind of the magneto-optical disk. The laser diode control circuit 70 controls the intensity of a laser beam to be output from an optical head 74 according to this modulated data.

A read LSI circuit 76 has an automatic gain control (AGC) circuit, filter, sector mark detecting circuit, analog/digital converting circuit (ADC) 78, frequency synthesizer 80, and read demodulator 82. The frequency synthesizer 80 generates a read clock synchronous with a VFO signal of a sector. The read demodulator 82 detects a sector mark from a pit signal or an MO signal input from the optical head 74, and outputs a detection signal to the ODC 60. The read demodulator 82 further converts the MO signal input from the optical head 74 into a digital value, and outputs the digital signal to the ODC 60.

The optical head 74 detects return light from the magneto-optical disk 64, and inputs an ID signal/MO signal to the read circuit 76. The controller 54 controls whether a sector address is to be detected by the pit or the MO signal, by detecting the kind of the magneto-optical disk. A spindle motor 84 rotates the magneto-optical disk 64. A spindle motor control circuit 86 controls the spindle motor 84 according to an instruction from the MPU 56.

A servo control circuit 88 has a TES detecting circuit for producing a TES signal from the return light of the optical head 74 and a FES detecting circuit for producing a FES signal from the return light of the optical head 74. The servo control circuit 88 further has a digital signal processor (DSP) for driving a track actuator of the optical head 74 by a track servo loop according to the TES signal and for driving a focus actuator of the optical head 74 by a focus servo loop according to the FES signal. The DSP further controls to drive a voice coil motor (VCM) for moving the optical head 74 across the tracks of the magneto-optical disk 64.

Power control of the laser beam to be focused from the optical head 74 onto the magneto-optical disk 64 will now be described. Recording/erasing/reproducing powers are preliminarily stored in the memory 58 in the controller 54 as initial values (defaults) measured at the factory. However, for high-accuracy power control, trial recording is performed with given timing under the control by the MPU 56. As the result of this trial recording, an optimum recording power, optimum erasing power, and optimum reproducing power are decided and stored into the memory 58. That is, the magneto-optical recording medium used herein is a recording medium for recording or reproducing marks on each land and each groove with the widths of the marks on each land and each groove being different from each other. Accordingly, the respective powers are stored into the memory 58 according to the different widths of the marks on each land and each groove.

The width of each mark to be recorded may be reduced by reducing the optimum power on the grooves as compared with the optimum power on the lands. However, a simple reduction in the optimum power causes a reduction in signal quality to increase jitter and error. In consideration of the signal quality, it is sufficient to reduce the optimum power on the grooves by about 3 to 7% of the optimum power on the lands. Further, although high-power recording is performed on the lands, a reproducing magnetic field is not rapidly increased. Therefore, trial writing is performed on the lands to thereby obtain an accurate optimum recording power PLbest.

The optimum recording power on the grooves may be obtained by subtracting 5% of the optimum recording power PLbest on the lands from the power PLbest or by measuring powers around a central value of the recording power in trial writing which central value is obtained by subtracting 5% of PLbest from PLbest. With this power control, recording on both the lands and the grooves can be performed with accurate optimum recording powers. In the case of optical recording, the heat by a laser beam is utilized to record marks. Accordingly, the recording power control may be replaced by heat control effected by configuring the laser diode control circuit 70 so that the pulse width or irradiation time of laser can be changed or by controlling the spindle motor control circuit 86 under the control by the MPU 56 so that the rotational speed of the magneto-optical disk 64 can be changed. With such heat control, recording with different mark widths between each land and each groove can be performed.

In the magnetically induced super-resolution reproducing method or the magnetically enlarged reproducing method, reproduction is performed by utilizing the relation between heat and reproducing magnetic field. Accordingly, optimum reproducing powers on the lands and the grooves may be obtained as in the case of obtaining the above-mentioned optimum recording powers on the lands and the grooves. Further, as similarly to the above, the reproducing power control may be replaced by heat control effected by configuring the laser diode control circuit 70 so that the pulse width or irradiation time of laser can be changed or by controlling the spindle motor control circuit 86 under the control by the MPU 56 so that the rotational speed of the magneto-optical disk 64 can be changed. With such control, marks having different widths on each land and each groove can be reproduced.

Further, two light sources and two optical heads for the lands and the grooves may be provided to control the beam diameters for the lands and the grooves, thereby allowing recording/reproducing of marks having different widths between each land and each groove. In the case that the magneto-optical disk is determined to be a medium for recording or reproducing marks having different widths between each land and each groove, the laser diode control circuit 70 controls the intensity or the like of the light beam according to the instruction from the MPU 56 in the controller 54, depending on whether the present position or target position of the beam spot is on any land or groove.

Whether the present position of the beam spot is on any land or groove may be detected by reading address information included in the ID signal recorded on the medium. By simply modifying a program, firmware, etc. stored in an MPU of an optical storage device known in the art, the drive control of the laser diode control circuit 70 and the spindle motor control circuit 86 can be performed to thereby realize an optical storage device which can record/reproduce marks having different widths between each land and each groove.

The present invention is applicable not only to a magneto-optical disk drive, but also to a phase-change type optical disk drive. Further, the present invention is not limited to a disk-shaped optical recording medium, but may be applied also to a card or tape formed with lands and grooves as recording tracks.

According to the present invention as described above, it is possible to provide a magneto-optical recording medium having recording tracks consisting of lands and grooves which can suppress an increase in reproducing magnetic field. Further, a reduction in C/N can be prevented by making the width of a mark recorded on each land greater than the width of a mark recorded on each groove. In the case of a magneto-optical recording medium, an increase in magnetic field required for reproduction can be suppressed.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A magneto-optical recording medium capable of reproducing a recorded mark smaller in size than a beam spot, having recording tracks consisting of lands and grooves, said magneto-optical recording medium comprising:

a transparent substrate on which said lands and said grooves are alternately formed;

a magnetic reproducing layer formed on said transparent substrate;

a magnetic recording layer formed on said magnetic reproducing layer;

each of said lands having a first width;

each of said grooves having a second width greater than said first width;

the depth of each groove being set to 60 nm or less; and the track pitch of said recording tracks being set to 0.7 $\mu$m or less.

2. A magneto-optical recording medium according to claim 1, wherein said second width of each groove is greater than said first width of each land and less than 1.28 times said first width of each land.

3. A magneto-optical recording medium according to claim 1, further comprising an intermediate layer interposed between said magnetic reproducing layer and said magnetic recording layer;

said magneto-optical recording medium being of a double-mask rear aperture detection type.

4. An optical recording medium having recording tracks consisting of lands and grooves, comprising:

a transparent substrate on which said lands and said grooves are alternately formed;

an optical recording layer formed on said transparent substrate by sputtering;

said optical recording layer having a first mark recorded on each of said lands and a second mark recorded on each of said grooves;

said first mark on each land having a first width; and said second mark on each groove having a second width smaller than said first width of said first mark.

5. An optical recording medium according to claim 4, wherein said second width of said second mark is not less than 0.95 times to less than 1 times said first width of said first mark.

6. An optical recording medium according to claim 4, wherein:

each land has a third width;

each groove has a fourth width greater than said third width of each land;

the depth of each groove on the substrate is set to 60 nm or less; and the track pitch of said recording tracks is set to 0.7 $\mu$m or less.

7. An optical recording medium according to claim 6, wherein said fourth width of each groove is greater than said third width of each land and less than 1.28 times said third width of each land.

8. An optical recording medium according to claim 4, wherein:

said optical recording layer comprises a magnetic reproducing layer formed on said transparent substrate, and a magnetic recording layer formed on said magnetic reproducing layer; and said optical recording medium is a magnetically induced super-resolution magneto-optical recording medium capable of reproducing said first and second marks each smaller in size than a beam spot.

9. An optical recording medium according to claim 8, wherein:

said optical recording layer further comprises an intermediate layer interposed between said magnetic reproducing layer and said magnetic recording layer; and said magnetically induced super-resolution magneto-optical recording medium is of a double-mask rear aperture detection type.

10. An optical recording/reproducing device for recording/reproducing information on an optical recording medium having recording tracks consisting of lands and grooves, comprising:

an optical head for directing a light beam onto said optical recording medium; and control means for controlling said light beam to be output from said optical head so that a first mark having a first width is formed on each of said lands and a second mark having a second width smaller than said first width is formed on each of said grooves.

11. A magneto-optical recording medium capable of reproducing a recorded mark smaller in size than a beam spot, having recording tracks consisting of lands and grooves, said magneto-optical recording medium comprising:

a transparent substrate on which said lands and said grooves are alternately formed;

a magnetic reproducing layer formed on said transparent substrate;

a magnetic recording layer formed on said magnetic reproducing layer;

each of said lands having a first width;

each of said grooves having a second width greater than said first width;

the depth of each groove being set in the range of 20–60 nm; and the track pitch of said recording tracks being set in the range of 0.2–0.7 μm.

12. A magnet-optical recording medium according to claim 11, wherein the depth of each groove is in the range of 30–50 nm and the track pitch of said recording tracks is in the range of 0.3–0.5 μm.

* * * * *